United States Patent [19]
Cushman et al.

[11] Patent Number: 5,904,081
[45] Date of Patent: May 18, 1999

[54] FASTENER AND TOOL COMBINATION FOR APPLYING EQUIVALENT TORQUE ALONG FASTENER LENGTH

[75] Inventors: William H. Cushman, Santa Barbara; John J. Brooks, Santa Ynez; Craig J. Kent, Solvang; Allen L. Deforrest, Santa Ynez; Thomas E. Wolverton, Goleta, all of Calif.

[73] Assignee: Santa Barbara Sensor Technologies, Santa Ynez, Calif.

[21] Appl. No.: 08/584,611

[22] Filed: Jan. 11, 1996

[51] Int. Cl.⁶ ........................................... B25B 23/00
[52] U.S. Cl. ..................... 81/461; 81/451; 81/176.15; 411/403
[58] Field of Search ............... 81/176.1, 176.15, 81/461, 451, 436; 411/395, 396, 399, 403, 404, 410, 919

[56] References Cited

U.S. PATENT DOCUMENTS

| | | |
|---|---|---|
| 430,234 | 6/1890 | Melaney . |
| 857,295 | 6/1907 | Mudge . |
| 1,087,024 | 2/1914 | Lingo . |
| 1,389,997 | 9/1921 | Sedgwick . |
| 2,101,938 | 12/1937 | Giberson . |
| 2,221,141 | 11/1940 | Kindt . |
| 2,329,398 | 9/1943 | Duffy .................................... 81/436 X |
| 2,400,684 | 5/1946 | Clark .................................... 411/403 X |
| 2,993,950 | 7/1961 | Forman . |
| 3,044,584 | 7/1962 | Thompson . |
| 3,424,212 | 1/1969 | Kemper . |
| 3,457,573 | 7/1969 | Patyna . |
| 3,888,144 | 6/1975 | Parsons ............................... 411/403 X |
| 4,258,596 | 3/1981 | Bisbing et al. ...................... 411/403 X |
| 4,642,101 | 2/1987 | Bradley . |
| 5,018,921 | 5/1991 | Pinney ................................. 411/410 X |
| 5,102,276 | 4/1992 | Gourd . |
| 5,169,400 | 12/1992 | Muhling . |

*Primary Examiner*—D. S. Meislin
*Attorney, Agent, or Firm*—W. D. English; Milord Keshishzadeh J. D.

[57] ABSTRACT

A threaded fastener and mating driver system is used to apply a uniform torque to the entire fastener body and thereby facilitate removal of stuck fasteners. The driver tool is a two stage driver with one stage driving the inner bore of the fastener and the second stage driving the fastener head. The two driver stages are linked via a series of pins, each pin acting as an individual lever, such that the two drivers apply torque equally to the fastener. The entire driver assembly is housed in a block which can be attached to a standard ratchet or driving tool. The fastener is designed to be installed using a single stage screwdriver and normally has a foil seal covering the bore drive portion of the fastener. If the fastener becomes stuck, the foil seal is broken and the two stage drive system, including a bore driver and a screw head driver, is inserted into the fastener to effect additional removal torque.

3 Claims, 3 Drawing Sheets

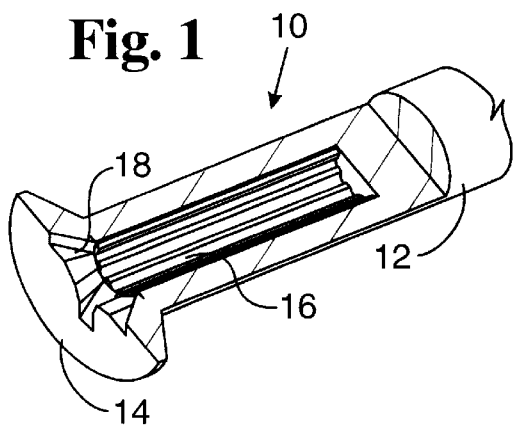
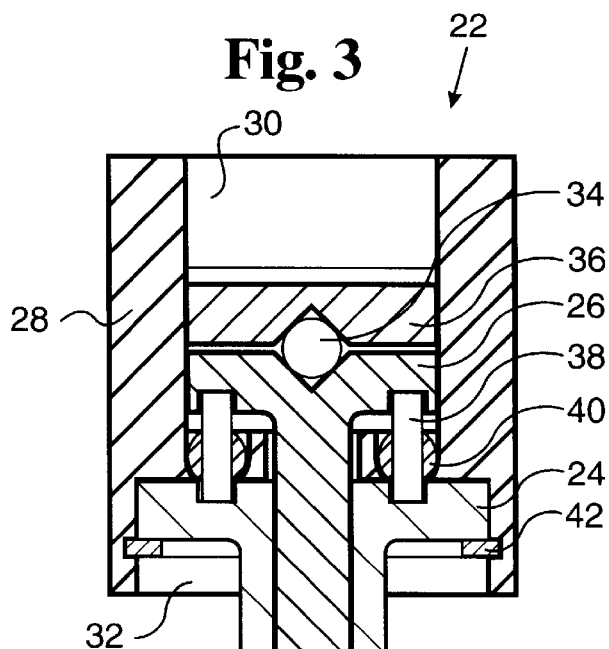
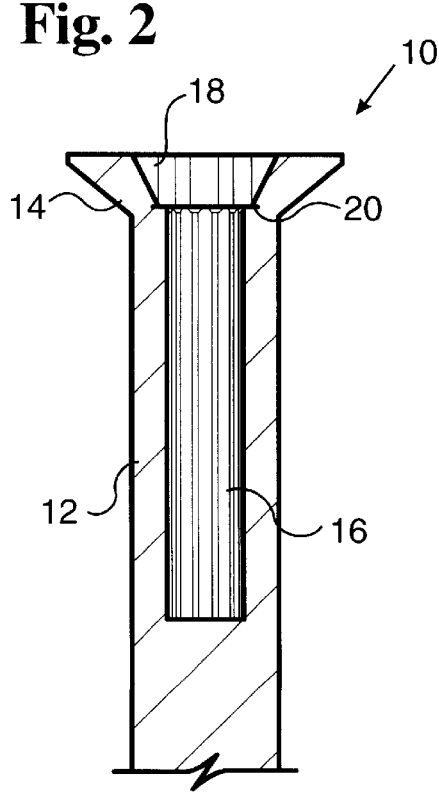
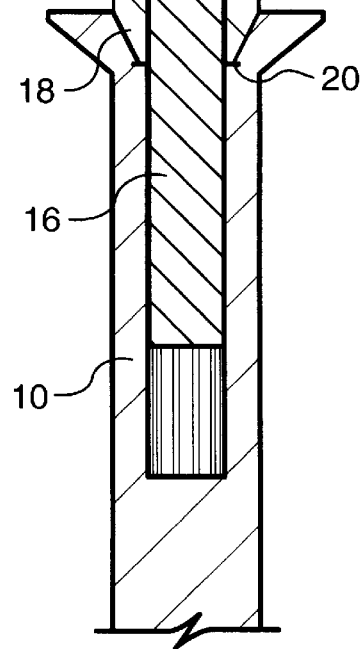

FASTENER AND TOOL COMBINATION FOR APPLYING EQUIVALENT TORQUE ALONG FASTENER LENGTH

BACKGROUND OF THE INVENTION

The present invention relates to fasteners, and particularly ones which are used in the aircraft industry to affix external components and skin to airframes. The inventors have developed a system for applying evenly distributed torque along the entire length of a threaded fastener used to hold down aircraft components. The present system will be particularly advantageous over current systems for removal of fasteners frozen in place due to corrosion, deformation, paint, or wear.

Modern aircraft are constructed, in some respects, as they have always been, a veneer or skin is stretched over and fastened to a frame which then forms the fuselage, airfoils, and other aerodynamic surfaces. Most commonly, the veneer is an aluminum alloy, and the fasteners are stainless steel. During initial assembly, the fasteners are tightened using one of several common head drive mechanisms such as the Phillips, TorqSet, Torx, or other drive mechanism with a matched fastener head. Technicians, however, are often required to remove the fasteners during the normal life of the aircraft for routine maintenance, to perform repairs, or to modify or upgrade the aircraft. The fasteners, during the removal process, are frequently damaged and, in some cases, must be drilled out and removed with a specially designed screw extractor. This can be extremely costly, time consuming, and often cause damage to the panel or adjacent structure. This problem has been documented a report issued by the U.S. Air Force, titled AF95-203 "Improved Recess Drive System for Fasteners".

While attempting to remove fasteners, torque applied only at the head of the fastener may be insufficient to effect removal for a variety of reasons: axis of torque application and screw center not coincident, cam out (stripping) of head, or dried paint under the screw head or in the drive faces. Also, if the screw threads are tightly stuck, the shear stresses where the head meets the screw body can often exceed the maximum allowable stresses and result in screw failure. Increasing the drive area, as the present invention does, reduces the pressure applied to the drive surfaces for a given torque. When a screw is drilled out for removal using an extractor tool, the increased surface area is what allows use of higher torque overall without metal deformation.

Another benefit of the present invention, especially for larger bolts, is the possibility of integrating strain gauges along an interior wall of the fastener for accurate monitoring of preload tension and torsion on the fastener. This could help eliminate many of the bolt failures which, due to the torsion force vector in addition to the tensile force vector during initial tightening, are most likely to occur upon installation. Integrated strain gauges could be of particular significance in larger bolts, especially those used in the construction of buildings, bridges, and vessels.

The problem of removing fasteners, frozen in place through oxidation, deformation, or as a result of excess paint and allow maintenance or replacement of aircraft components has presented a challenge to designers. The development of a method, other than drilling out the fastener, for removing frozen fasteners would satisfy a long felt need in the field of aircraft maintenance and modification.

SUMMARY OF THE INVENTION

The present invention for fabricating a hollow threaded fastener which accepts a multiple drive removal tool allows the fastener to be installed using standard driver bits, yet removed with the added torque available using a multiple drive surface.

The present invention is based on standard machine screws with countersunk heads used in the assembly of external aircraft facias. The system anticipates the possibility that a fastener may have to be drilled to be removed after many hours of service. All screws in the present invention are manufactured with a hollow shank and standard screw head. A breakable membrane keeps dirt out of the hollow shank, but allows access to the screw head. Thus, screws can be installed with universal screwdrivers and, if necessary, the seal can be broken to allow the internal torque driver to apply additional torque.

The screw removal tool, designed to break free frozen screws, is a combination head driver with concentrically located bore driver so that a common torsion axis is formed. Each driver has an integral circular flange which is drilled at radial points to accept drive pins. The two drivers are then joined by the radially disposed drive pins, and the whole assembly is housed in a drive head designed to fit on a standard ratchet, or air wrench. The drive head transmits force to the two drivers via the pins. The contact point between the housing and any given pin forms a fulcrum, with the bore driver located at one end of the pin and the head driver located at the second end of the pin. Using this arrangement, the ratio of opposing forces, and therefore torque applied, of the two drivers can be adjusted by moving the pin fulcrum relative to the housing.

These and other features, aspects, and advantages of the present invention will become better understood with reference to the following appended claims, and accompanying drawings.

BRIEF DESCRIPTION OF THE DRAWINGS

FIG. 1 is a partial cutaway view of the threaded fastener, showing the head driver aces and the internal splined bore.

FIG. 2 is a sectional view of the fastener which shows the preferred embodiment having a blind hole (to maintain a pressure gradient between interior and exterior of aircraft) and a breakable foil dust and debris seal for the spline drive.

FIG. 3 and FIG. 9 are sectional view of the entire fastening system, including the driver mechanism and the hollow shank screw. The drive block is shown with the internal and external torque driver held in position by the retainers. Also, the drive pins which distribute forces between the two torque drivers are visible. One can see the mating relationship between the tool and the fastener.

DETAILED DESCRIPTION OF A PREFERRED EMBODIMENT

Figure 4:
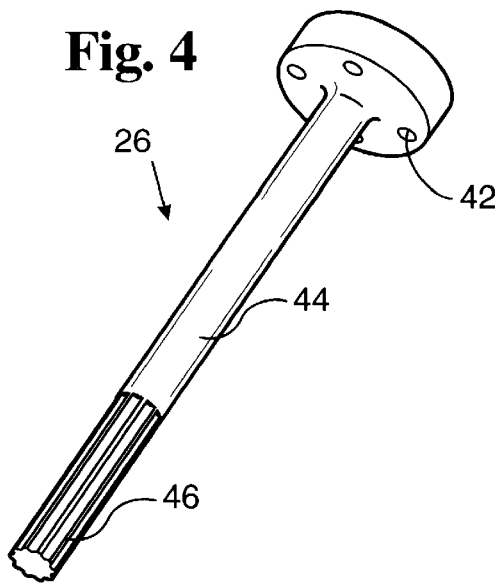
FIG. 4 depicts the bore drive tool in perspective view. The holes which accept the drive pins are shown along with the spline drive surface.

With reference to FIG. 1, a cutaway perspective view of a high torque fastener 10 is shown. The preferred fastener 10 has a 100 degree flush head with a fine thread whose nominal diameter is 0.190, 0.250 or 0.312. Though, there is no limit against using larger or smaller fasteners 10, or varying the thread pitch. The threaded shank 12 is integrated into the head 14 and would normally be formed by forging a steel wire to produce the head 14, while the wire then has threads cut along its length to form the shank 12 of fastener 10. While the preferred material for the present invention is stainless steel, other steel alloys, polymers, or non ferrous metals may be used. Internal to the shank 12, a bore drive surface 16 is cut. In the preferred embodiment, the bore drive surface 16 is a blind hole with longitudinal splines running the length of the bore drive surface 16. Bore drive surface 16 may extend the entire length of shank 12 in other versions of the present invention. Alternatively, bore drive surface 16 may have a cross section which is a polygon, threaded, varies in diameter, or is circular. A circular cross section of bore drive surface 16 is best suited if a miniature strain gauge (not shown) is affixed to indicate actual material strain on the fastener shank 12. A recessed external drive cut 18 is located in the central portion of the head 14. The external drive cut 18 is multi faceted, and designed to accept a commercially available screwdriver or torque driver tip. The preferred shape for the external drive cut 18 will allow a standard sized Phillips head screwdriver to install the fastener 10. Alternative configurations for the external drive cut 18 will allow installation of the fastener 10 using a slotted, Torx, Hi-Torque, Torq-Set, Tri-Wing, or other commercial or proprietary screwdriver drive pattern.

With regard to FIG. 2, a sectional view of the preferred embodiment of the fastener 10 is shown. The shank 12, head 14, bore drive surface 16, and external drive cuts 18 are all visible. The bore drive surface 16 is shown with a series of spline cuts which end in a blind hole, in this preferred design. Alternate configurations of the fastener 10 would have bore drive surface 16 extend the entire length of shank 12. Other embodiments of the present invention include a strain gauge (not shown) attached to or imbedded in the bore drive surface 16. When using a strain gauge, the bore drive surface 16 may be smooth, and either a blind hole, or extend along the entire length of the shank 12. Electrical leads for the strain gauge could then exit the shank 12 at either end.

Also shown in this view is a debris seal 20 located approximately where the bore drive surface 16 meets the external drive cuts 18. The preferred debris seal 20 is a metallic foil, hermetically sealed around its perimeter to the fastener head 14. Bonding, brazing, crimping, soldering, or pressing are all suitable methods of affixing the debris seal 20 in place. The debris seal 20 may be aluminum, copper, steel, or other metal, and should be able to be pierced using hand pressure for removal of the fastener 10. Using a blind hole as the preferred design of the bore drive surface 16, the debris seal 20 may be a permanent or removable metallic, plastic, or elastomer plug or membrane since the debris seal 20 would not be maintaining a potential atmospheric pressure differential across the bore drive surface 16. The debris seal 20 is designed to keep the bore drive surface 16 free from dirt or other foreign matter. In an alternative version of the fastener 10, if the bore drive surface 16 extends the entire length of shank 12, the debris seal 20 shall prevent air from freely flowing along the length of bore drive surface 16 thereby maintaining a pressure differential between the bore drive surface 16 and the external drive cuts 18. In the preferred embodiment, the debris seal 20 will remain in place during installation of the fastener 10 and either be removed or pierced during removal, when additional and consistent torque must be applied along the length of fastener 10.

Figure 9:
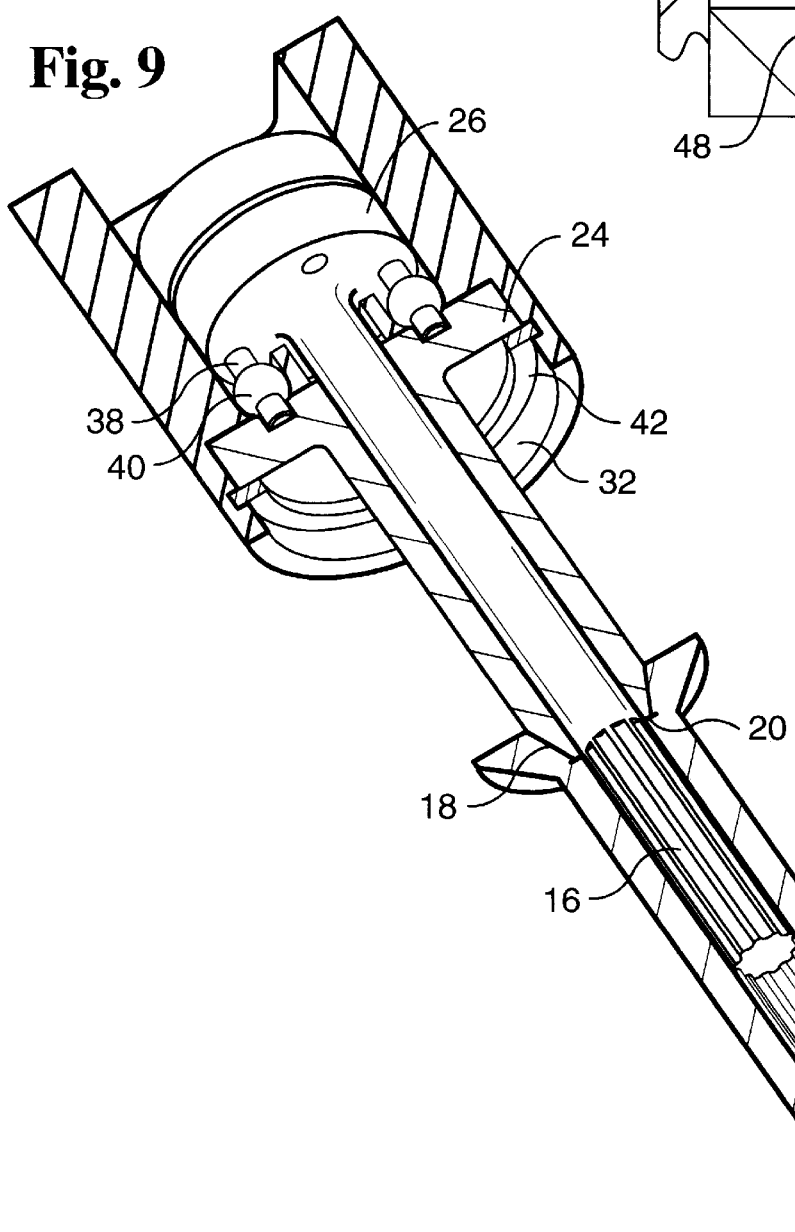

With reference to FIG. 3 and FIG. 9, an assembly view of the removal tool 22 is shown. The removal tool has a bore driver 26 and a head driver 24 which are both housed in a drive block 28. The bore driver 26 extends through a bore in the head driver 24, and is designed to pierce the debris seal 20 and engage with the bore drive surface 16 of the fastener 10. The head driver 24 is designed to engage with the external drive cuts 18, and not pierce the debris seal 20. In the preferred embodiment of the removal tool 22, the bore driver 26 fits into an upper cavity 30 of the drive block 28. A ball bearing 34 is then compressed between a central detent in the base of the bore driver 26 and a threaded upper retainer 36. Opposing the compressive force of the ball bearing 34 is a series of radial drive pins 38 with spherical sleeves 40. The drive pins 38 are located radially around the base of bore driver 26, pass through holes in drive block 28, and fit into mating holes in the base of head driver 24. Through this arrangement, torsional friction force exerted on the bore driver 26 by the ball bearing 34 is negligible and virtually all torsion force exerted on the bore driver 26 is done so by the drive pins 38. The base of the head driver 24 is contained within a lower cavity 32 of the drive block and longitudinally retained with a circular clip 42. A portion of the upper cavity 30 of the drive block is square or has drive surfaces to allow a hand, air, or electric wrench (not shown) to apply torque to the drive block 28 and therefore the entire removal tool 22.

With regard to FIG. 4, bore driver 26 is shown in perspective view. Bore drive pin holes 42 are located in a radial pattern along the base of bore driver 26. Bore driver 26 has a bore shank 44 into which bore facets are cut 46. The preferred bore facets 46 are splines which, when viewed in cross section, resemble a many pointed star. The bore facets 46 may be any polygon which will allow the bore driver 26 to transmit torque.

Figure 5:
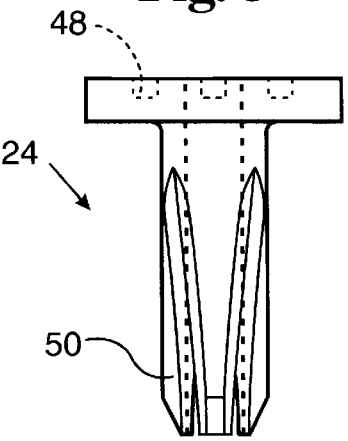
FIG. 5 is a side view of the screw head drive tool with hidden lines indicating the internal bore and holes for accepting the drive pins.

With regard to FIG. 5, a side view of the head driver 24 is shown with the head drive pin holes 48 extending into the flange at the base of the head driver 24. The head drive facets 50 are designed to match any of the commercially available screw head patterns. The preferred pattern for the head driver facets 50 is the Phillips head drive. Proprietary patterns for the head driver facets 50 may also be used. An axial bore along the length of the head driver 24 allows the bore driver shank 44 to pass through and extend beyond both ends of the head driver 24.

In one embodiment of the present invention, the torsional stiffness of the head driver 24 is closely matched to the torsional stiffness of the bore driver 26. The torsional stiffness is defined by the product of the shear modulus and the internal polar moment of inertia divided by the effective length. Since the bore driver 26 will always have a greater length than the head driver 24, the torsional stiffness of the bore driver 26 and the head driver 24 can be set approximately equal by choosing materials such that the shear modulus of the bore driver 26 is greater than the shear modulus of the head driver 24. Alternatively, the polar moment of inertia with respect to the bore driver 26 axis can be minimized, while the polar moment of inertia with respect to the head driver 24 axis is maximized. An alternate version of this invention allows a small angular twist of the bore driver 26 relative to the head driver 24, such that the bore driver 26 will engage with the bore drive surface 16 prior to the head driver 24 exerting sufficient force on the external drive cuts 18 to cause failure of the head 14.

Figure 6:
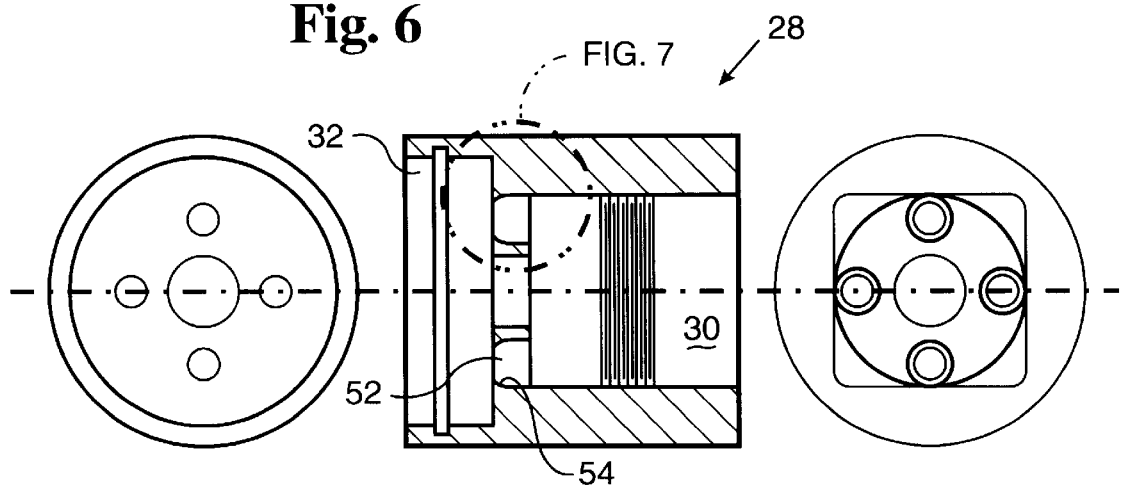
FIG. 6 is an orthogonal projection of the drive block indicating the two opposing cavities; one for the bore drive and one for the head drive mechanisms. The spherical seats are shown machined into the drive block.

With respect to FIG. 6, a cross sectional view, and two orthogonal projections of the drive block 28 are shown. The upper cavity 30 and the lower cavity 32 of the drive block 28 can be identified. A thrust wall 52 divides the upper cavity 30 from the lower cavity 32. In the preferred embodiment, a series of four spherical seats 54 are machined in the thrust wall 52 at 90 degree spacings. Alternate configurations of the present invention may function with two or more spherical seats 54. The entry portion of upper cavity 30 or the drive block 28 is preferably shaped to accept a standard ½" or ¾" ratchet drive. Alternate drive tools may be usable with the drive block 28 by varying the shape of the upper drive cavity 30. The preferred drive block 28 is fabricated of hardened tool steel, with other materials being acceptable.

Figure 7:
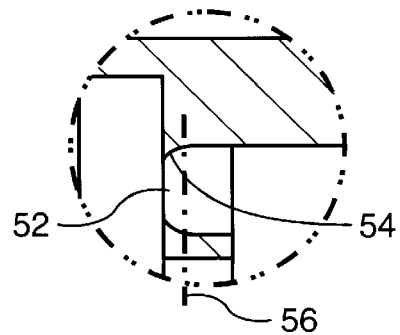
FIG. 7 is an exploded view of the spherical seat machined into the drive block. The approximate contact line between the spherical seat and the spherical sleeve (not shown) is drawn in this view.

With regard to FIG. 7, an exploded view of the spherical seats 54, in cross section, is shown. The spherical seats 54 are designed to allow the spherical sleeve 40 (omitted for clarity) to have a circular bearing surface 56. In the preferred embodiment, all radial force is transferred from the drive block 28 to the spherical sleeve 40 (omitted) at the circular bearing surface 56. Therefore, a suitably hard circular bearing surface 56 and some lubrication is necessary to assure reasonable tool life.

Figure 8:
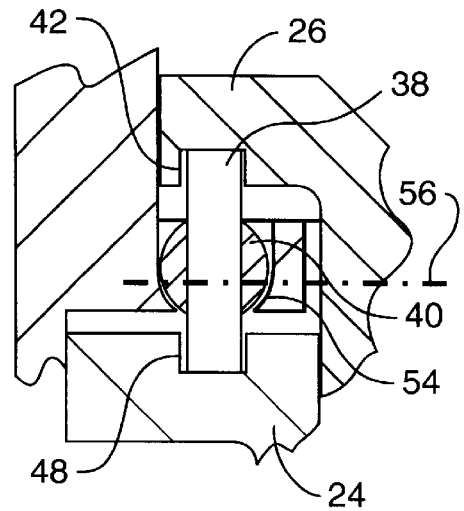
FIG. 8 shows the relationship of the spherical seat and sleeve, drive pin, bore driver, and head driver when fully assembled. The leveraged force transmission between the bore driver and the head driver can be appreciated in this view.

Viewing FIG. 8, a sectional view of the drive pin 38, the spherical sleeve 40, shows how the spherical sleeve 40 seats into the spherical seat 54 while one end of the drive pin 38 seats into the bore driver pin holes 42, and the other end of the drive pin 38 seats into the head driver pin holes 48. The drive pins 38 and the spherical sleeves 40 allow only the shear component and the compressive component of force to be transmitted between bore driver 26 and head driver 24 because the spherical sleeves 40 will rotate around circular bearing surface 56 when a bending or torsion force is applied to drive pin 38. As the spherical sleeve 40 contacts the spherical seat 54 at circular bearing surface 56, force will be transferred to the bore driver 26 and head driver 24 in proportion to the length of drive pin 38 from circular bearing surface 56 to the bore driver 26 and head driver 24 respectively. Therefore, the ratio of torque transmitted by the drive block 28 to the bore driver 26 and to the head driver 24 can be varied or "tuned" according to the location of spherical sleeve 40 along the length of drive pin 38. The objective of "tuning" the position of the spherical sleeve 40 along the drive pin 38 is to match the torque transmitted to fastener 10 by the bore driver 26 with the torque transmitted to fastener 10 by the head driver 24, given a single torque input to the drive block 28.

What is claimed is:

1. A tensile fastening system comprising:
   a threaded fastener having a head and a shank; said shank having a substantially deep axial cavity; said head having a multi faceted drive cut; said multi faceted drive cut having a generally larger cross section than said axial cavity; said multi faceted drive cut being axially distal to said axial cavity; said axial cavity having a generally spline shape in cross section;
   and a plurality of torque applicators disposed about a common drive axis; said plurality of torque applicators having a head torque applicator and a bore torque applicator, said head torque applicator functioning cooperatively with said bore torque applicator; said head torque applicator is matched to engage with said multifaceted drive cut, and said bore torque applicator is matched to engage with said axial cavity;
   said bore torque applicator and said head torque applicator are interlocked axially along said common drive axis by a multiplicity of leveraged drive pins; said leveraged drive pins having a first end and a second end, said first end connecting to said head torque applicator and said second end connecting to said bore torque applicator; said leveraged drive pins being contained within a drive body such that a torque applied to said drive body imparts a torque on said head torque applicator which in turn imparts a torque on said leveraged drive pins which in turn impart a torque on said bore torque applicator thus resulting in a nearly equal torsion applied by said head torque applicator and by said bore torque applicator at all longitudinal points along said fastener, including a substantial portion of said shank.

2. A tensile fastening system comprising:
   a threaded tensile means for clamping adjacent components; said tensile means having a hollow cavity along a substantial central axis of said threaded tensile means; said tensile means having a drive cut pattern at a countersunk head end of said tensile means; an opposing end of said hollow cavity being substantially distal to said drive cut pattern; said hollow cavity being defined by a wall which is generally spline shape in cross section;
   a multiplicity of engagable torque transmission means for transferring force; among said torque transmission means being a bore driver and a head driver; said bore driver being mechanically engaged with said head driver; said bore driver and said head driver having a common axis of rotation; said bore driver and said head driver having a torsional stiffness of approximately equal value; and
   a drive means for simultaneously rotating said bore driver and said head driver while said bore driver is engaged with said hollow cavity, and said head driver is engaged with said drive cut pattern;
   said drive means having a frame and fulcrum pin means for distributing forces between said bore driver and said head driver.

3. A tensile fastening system comprising:
   a threaded tensile means for clamping adjacent components; said tensile means having a hollow cavity along a substantial central axis of said threaded tensile means; said tensile means having a drive cut pattern at a countersunk head end of said tensile means; an opposing end of said hollow cavity being substantially distal to said drive cut pattern; said hollow cavity being defined by a wall which is generally spline shape in cross section;
   a multiplicity of engagable torque transmission means for transferring force; among said torque transmission means being a bore driver and a head driver; said bore driver being mechanically engaged with said head driver; said bore driver and said head driver having a common axis of rotation; said bore driver and said head driver having a torsional stiffness of approximately equal value; and a drive means for simultaneously rotating said bore driver and said head driver while said bore driver is engaged with said hollow cavity, and said head driver is engaged with said drive cut pattern;

said drive means having a frame and fulcrum pin means for distributing forces between said bore driver and said head driver;

said fulcrum pin means comprising a plurality of rods, each said rod passing through a stabilizing and compliant sphere and opposing ends of each said rod loosely coupling said bore driver to said head driver.

* * * * *